(12) United States Patent
Stickle

(10) Patent No.: US 10,108,692 B1
(45) Date of Patent: Oct. 23, 2018

(54) DATA SET DISTRIBUTION

(71) Applicant: Amazon Technologies, Inc., Reno, NV (US)

(72) Inventor: Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

(21) Appl. No.: 14/054,456

(22) Filed: Oct. 15, 2013

(51) Int. Cl.
 *G06F 17/30* (2006.01)

(52) U.S. Cl.
 CPC .............................. *G06F 17/30598* (2013.01)

(58) Field of Classification Search
 None
 See application file for complete search history.

(56) References Cited

U.S. PATENT DOCUMENTS

| | | | | |
|---|---|---|---|---|
| 7,058,641 | B1* | 6/2006 | Franz | G06Q 10/107 |
| 8,676,772 | B2* | 3/2014 | Gislason | G06F 17/30 |
| | | | | 707/696 |
| 8,996,464 | B2* | 3/2015 | Zhou | G06F 17/30584 |
| | | | | 707/635 |
| 2005/0114362 | A1* | 5/2005 | Colleran | G06F 8/61 |
| 2005/0210151 | A1* | 9/2005 | Abdo | H03M 7/3086 |
| | | | | 709/247 |
| 2008/0147754 | A1* | 6/2008 | Littlefield | G06F 17/302 |
| 2008/0216177 | A1* | 9/2008 | Yokosato | G06F 21/10 |
| | | | | 726/26 |
| 2009/0248695 | A1* | 10/2009 | Ozzie | H04L 67/2861 |
| 2009/0276516 | A1* | 11/2009 | Ruppert | A63F 13/12 |
| | | | | 709/224 |
| 2011/0055209 | A1* | 3/2011 | Novac | G06F 17/211 |
| | | | | 707/737 |
| 2012/0222063 | A1* | 8/2012 | Mao | H04N 7/17318 |
| | | | | 725/31 |
| 2012/0259946 | A1* | 10/2012 | Stockhammer | H04L 65/105 |
| | | | | 709/217 |
| 2012/0311099 | A1* | 12/2012 | Yoshida | G06F 17/30209 |
| | | | | 709/219 |
| 2013/0114812 | A1* | 5/2013 | Gidwani | H04L 9/08 |
| | | | | 380/255 |
| 2013/0151581 | A1* | 6/2013 | Leggette | H04L 67/10 |
| | | | | 709/201 |
| 2013/0166906 | A1* | 6/2013 | Swaminathan | H04L 65/4084 |
| | | | | 713/155 |
| 2013/0173716 | A1* | 7/2013 | Rogers | H04L 51/14 |
| | | | | 709/206 |
| 2013/0283393 | A1* | 10/2013 | Hierro | G06F 21/10 |
| | | | | 726/27 |

(Continued)

*Primary Examiner* — Bai D Vu

(74) *Attorney, Agent, or Firm* — Thorpe North & Western, LLP.

(57) ABSTRACT

A method is described for distributing a data set. The method may include dividing a data set into a number of data groupings based on a data set attribute value. The groupings of data may be stored in a data store and may be associated with metadata that describes a grouping of data. A grouping of data may be distributed by generating a reference that may be used to access the grouping of data in the data store. The reference may include information that enables access to the grouping of data. When presented, the information included in the reference may be authenticated whereupon the grouping of data may be provided.

20 Claims, 10 Drawing Sheets

(56) References Cited

U.S. PATENT DOCUMENTS

| | | | |
|---|---|---|---|
| 2013/0339359 A1* | 12/2013 | Goyal | G06F 17/30321 707/737 |
| 2014/0168247 A1* | 6/2014 | Williams | G09G 5/02 345/589 |
| 2014/0215477 A1* | 7/2014 | Chen | G06F 9/5066 718/102 |
| 2014/0289246 A1* | 9/2014 | Gomes | G06F 17/30525 707/737 |
| 2014/0304373 A1* | 10/2014 | Tarbox | H04L 65/60 709/219 |
| 2014/0310819 A1* | 10/2014 | Cakarel | H04N 21/2225 726/26 |
| 2015/0019968 A1* | 1/2015 | Roberts | G11B 27/28 715/719 |
| 2015/0052571 A1* | 2/2015 | Stokking | H04N 21/242 725/116 |
| 2015/0242762 A1* | 8/2015 | Cox | G06N 5/025 706/11 |

\* cited by examiner

DATA SET DISTRIBUTION

BACKGROUND

The amount of data collected and stored by various entities is increasing year over year. The data collected, sometimes referred to as "big data", may include data sets that may be beyond the ability of commonly used software tools to manage and process the data sets within a reasonable time period due to the data sets size. Data stores have been developed to better handle large data sets, such as non-relational databases and distributed database systems. These data stores may be used to capture and store large data sets in the areas of science, education, government and business, where persons working in these industries may encounter limitations utilizing data due to the amount of data encountered.

As data is gathered by an increasing number of computing devices and systems, opportunities to utilize the data may also increase. For example, financial institutions, such as stock exchanges, may capture and store a large amount of trading data where the trading data may contain a fine level of stock tick information for each individual stock. Because of the fine level of granularity that may be captured within a data set, various entities may wish to analyze data at various levels of granularity contained within a larger data set.

DETAILED DESCRIPTION

Figure 1A:
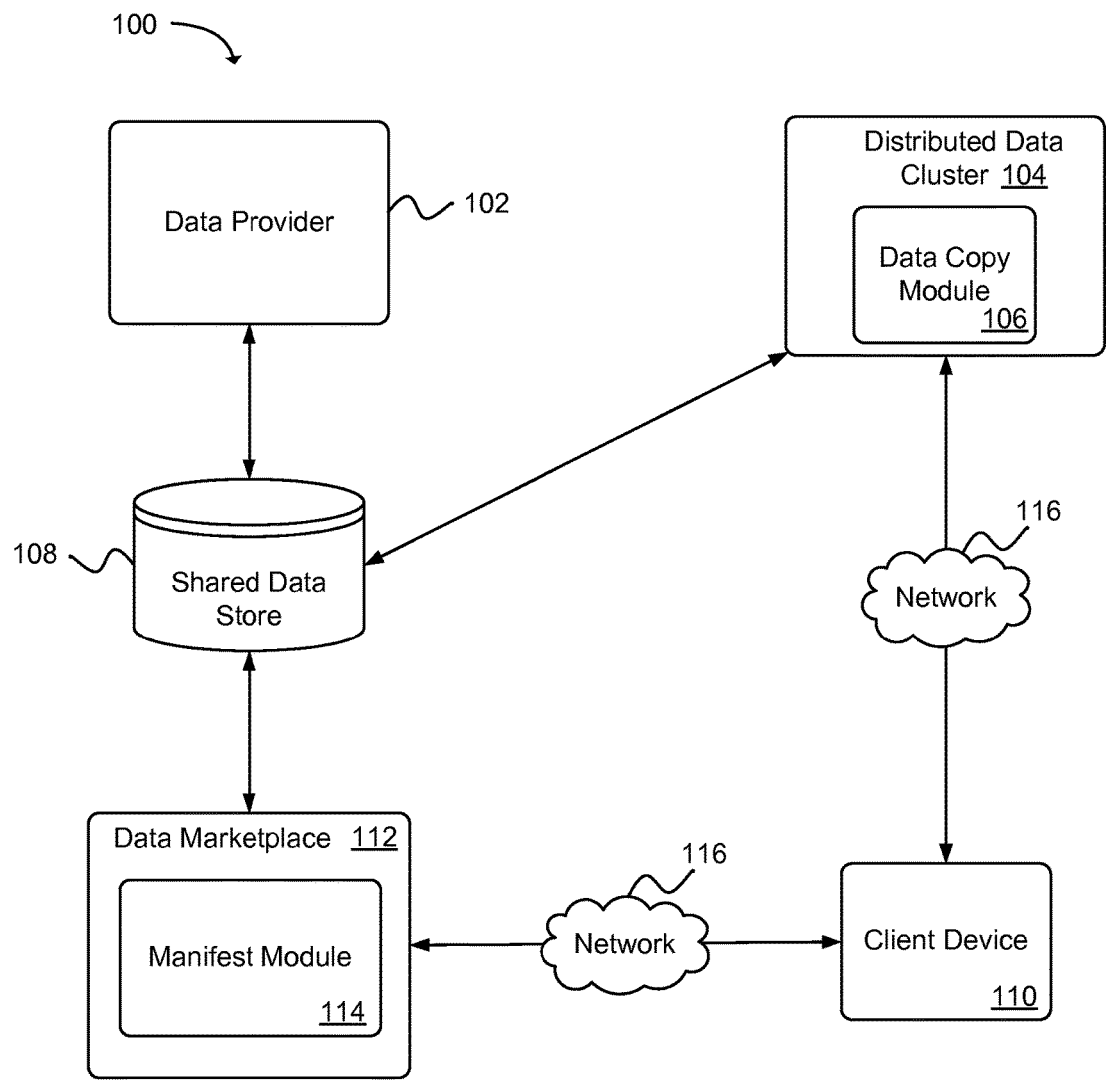
FIG. 1a is a diagram illustrating an example system for distributing data sets within a networked environment.

A technology is described for dividing a data set into a number of data files and licensing and distributing the data set via the data files. The data files may be made available through a data marketplace enabling those who may be interested in acquiring data from the data set to obtain the data files containing the data. Because of the size of some data sets, a data store system, such as a non-relational or relational distributed data store, may be used to store the large data sets. Software frameworks including Hadoop and MapReduce may be used to support access, management, and processing of large data sets stored in a distributed data store.

In one example configuration, a data set may be retrieved from a distributed data store using a distributed application whereupon the data set may be divided into a number of data files. Data within the data files may be grouped together based on a common dimension. For example, data may be grouped using a data attribute and a common value of the data attribute. As a specific example, a stock exchange may store stock trading data within a single data set. The stock trading data may be divided into a number of data files by dividing the data set into individual stocks with associated stock tick data and then grouping the stock tick data by a date. More specifically, stock trading data may be separated, for example, into stock tick data for General Electric Co. (GE), AT&T Inc. (T) or Coca-Cola Co. (KO), where each company's stock tick data may be further grouped by a date, so that a data file may contain stock tick data for a single trading day, week or month.

The data files may then be stored in a shared data store where each data file may be associated with metadata that may be used to identify a data file. In one example, the metadata may be separately stored from the data file and may contain a description of the data within the data file, a date associated with the data within the data file and a reference that provides a location of the data file within the shared data store. When searching for a specific data file within the shared data store, a searching method may read the metadata in order to locate a data file.

The data files stored in the shared data store may be accessible to those who may wish to acquire one or more of the data files. In one example, customers may acquire rights to obtain a data file via a data marketplace. The data marketplace may be accessible by way of a user interface that allows a customer using a client device to select a data file that the customer wishes to acquire rights to.

After one or more data files containing data that the customer may wish to acquire are selected, a manifest file may be created. A URL may be generated for each data file selected and may be inserted into the manifest file. The URL may contain additional information, such as information that identifies a customer and information that can be used to determine access to the data file. In one example, the additional information included in the URL may be an electronic signature that identifies a customer and an expiration date and time that indicates when the data file may no longer be accessible to the customer. The manifest file may act as a license to allow associated data files to be accessed and copied. In one example, after creating the manifest file, the manifest file may be provided to the customer. The customer may then engage a data copy module that uses the URLs contained in the manifest file to access respective data files and to copy the data from the data files to a customer's data store. In one example, the data from the data files may be copied to a distributed data store where the data copy module may instruct a node within a distributed data store cluster to access a data file using an associated URL from the manifest file and copy the data to the distributed data store cluster. Once the data from the data files has been copied to the customer's data store, the customer may make use of the data. As a specific use example, a customer may allow an application (e.g., a distributed processing application) to generate computing results using the data from the data files as input.

FIG. 1a is a diagram illustrating a high level example of a system 100 for distributing data sets via a data marketplace 112. The system 100 may include a data provider 102 that provides a data set to a shared data store 108 where the data set may be divided into a number of data files that can be shared and/or purchased by way of the data marketplace 112.

The data provider 102 may include a data store that contains a data set that is to be divided into a number of data files. Thus, distribution of the data within the data set may be possible when the data set is of a size that makes distribution difficult. The data store of the data provider 102 may be designed to manage large data sets. One example of a data store may be a distributed data store. A distributed application that can process large data sets with a parallel distribution and parallel processing method on a distributed data cluster, such as a MapReduce application, may be used to retrieve and organize a data set. The resulting data may be placed in a number of data files and may be made available to various customers via the data marketplace 112.

A client device 110 may access the data marketplace 112 through a communications network 116, whereupon a customer using the client device 110 may be presented with data files or data topics related to metadata that may be available to the customer to acquire. In one example, data files may be associated with metadata that may be used to identify the data files. The metadata may include a description of the data within the data file (e.g., General Electric Stock Trading Data), a date associated with the data (e.g., Mar. 6, 2009) and/or a URL that specifies a location of the data file within the shared data store 108. The metadata may be stored in a data store that may be independent of the data files, and/or the metadata may be included in a data file. When searching for a data file, the metadata may be used to locate the data file. For example, a data marketplace user interface may enable a customer to perform a search of a data store containing the metadata associated with the data files or search the shared data store 108 for metadata contained in a data file or a range of data files. When searching for one or more data files, the metadata may be read and upon finding metadata associated with a data file that matches parameters of the search, the metadata for the data file may be returned to the data marketplace user interface and displayed to the customer.

When a customer selects a data file via the data marketplace 112, a manifest module 114 may be used to generate a reference (e.g., a URL) to the data file and the manifest module 114 may then include the reference in a manifest file. The manifest file may contain a reference to each data file selected by the customer or the data files related to the metadata associated with the topic selected by the customer. The reference, in one example, may be a URL (Uniform Resource Locator). The URL may provide a location of a data file and may contain an electronic signature and an expiration date and time. After including the URL in the manifest file, the manifest file may be provided to the client device 110 via the communications network 116.

After receiving the manifest file, the manifest file may be provided to a data store system that may be accessible to the client device. In one example configuration, the client device 110 may authenticate to a distributed data store cluster 104 that includes a data copy module 106 and provide the manifest file to the data copy module 106. The data copy module 106 may read the manifest file and identify the URLs contained in the manifest file and may then direct the nodes of the distributed data store cluster 104 to retrieve the data from the data files located in the shared data store 108 using the respective URLs.

When retrieving data from a data file located on the shared data store 108 using a URL, the information included in the URL may be authenticated prior to allowing the data copy module 106 to access and copy the data from the data file. For example, the URL may contain an electronic signature that has been created or encrypted using a private key held by the manifest module 114 or the data marketplace 112. The electronic signature may be verified by decrypting the electronic signature using a public key. Moreover, the URL may contain an expiration date and a time in addition to an electronic signature. The expiration date and time may be compared to a current system date and time, and if the expiration date and time are later than the current system date and time, and if the electronic signature is authenticated, then the data copy module 106 may copy the data for the data file(s) from the shared data store 108 to the distributed data cluster 104.

Figure 1B:
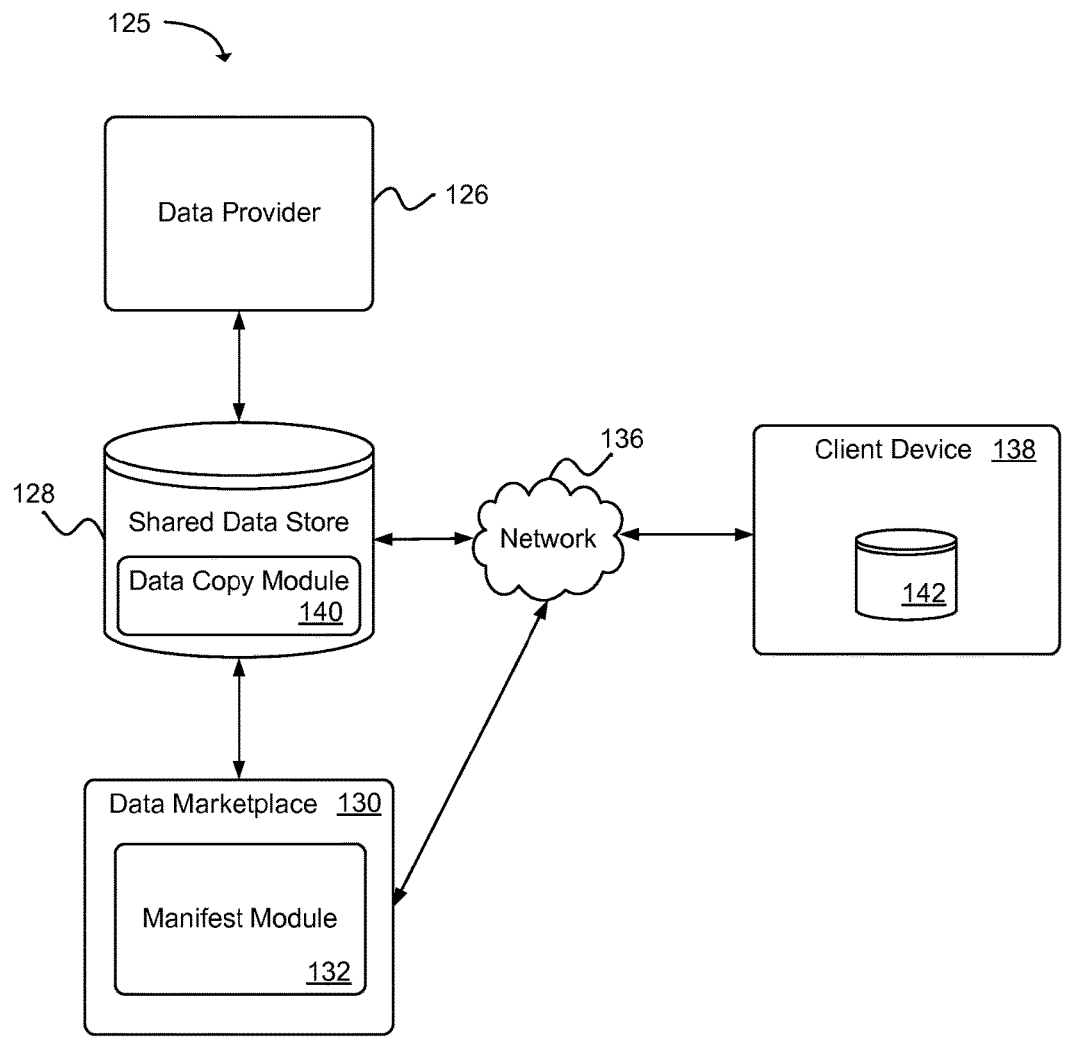
FIG. 1b is a diagram that illustrates an example system for distributing a data set to a data store located on a client device.

FIG. 1b is a diagram illustrating a high level example of a system 125 similar to that of FIG. 1a, wherein the system 125 includes a data provider 126, a shared data store 128, a data marketplace 130 and a client device 138. The data provider 126 may provide a data set that may be divided into a number of data files as described in FIG. 1a. The data files may be stored within a shared data store 128 where the data files may be made available to a client device 138 by way of the data marketplace 130.

In one example configuration, a customer using the client device 138 may access the data marketplace 130 via a user interface and select one or more data files containing data or data topics that the customer may wish to acquire. After selecting the data topics and/or data files, a manifest module 132 may create a manifest file containing a URL for each data file selected. The manifest module 132 may then provide the manifest file to the client device 138 via a communications network 136. Upon the client device 138 receiving the manifest file, the manifest file may be provided to a data copy module 140 located on the shared data store 128, where the data copy module 140 may use the URLs within the manifest file to access a respective data file in the shared data store 128 and copy the data contained in the data file to a data store 142 contained on the client device 138.

Figure 2:
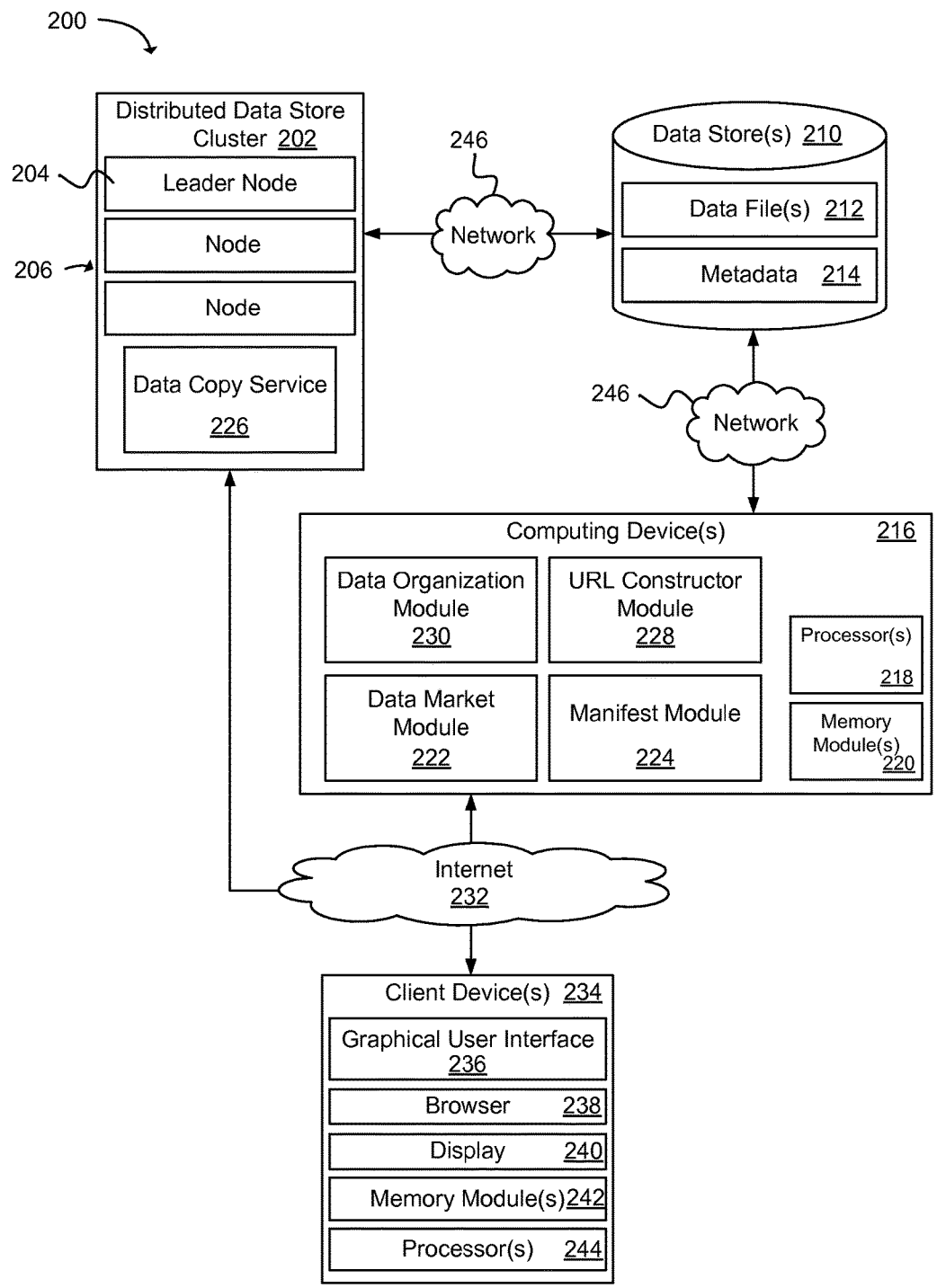
FIG. 2 is a block diagram illustrating various components of an example system for distributing data between data stores.

FIG. 2 is a block diagram illustrating an example of various components of a system 200 on which the present technology may be executed. The system 200 may include a computing device 216 that may be in communication with a number of client devices 234 by way of a communications network, such as the Internet 232. The system 200 may also include a distributed data store cluster 202 that may be accessible to the computing device 216, the client devices 234 and to a data store 210.

In one example configuration, the computing device 216 may include a data organization module 230, data market module 222, URL constructor module 228, manifest module 224 as well as other services, processes, systems, engines, or functionality not discussed in detail herein. The data organization module 230 may be used to identify a data set in a data store and group the data in the data set into one or more data files. The data store containing the data set may be any type of data store. In one example, the data store may be a distributed data store cluster 202 that may be contained within a distributed computing environment. The distributed data store cluster 202 may include one or more nodes 206 and a leader node 204 implemented as a virtual computing instance with one or more virtual machines running thereon. A data set may be distributed across the nodes 206 of the distributed data store cluster 202 within the distributed computing environment.

The data organization module 230 may be used to identify and retrieve a data set from the distributed data store cluster 202. A data set may be mapped into groupings of data where the groupings of data may, in one example, be based on specific values in one or more attribute values (e.g., columns). As an illustration, marketing data may be collected over a period of time which may be arbitrarily collected and stored in a data set. The marketing data may be valuable to some businesses which may be willing to purchase the marketing data, but the data set as a whole may be prohibitively large to distribute to the businesses or the business may want to pay for just a sub-portion of the data set. The marketing data may be organized into logical subsets of marketing data, which a business may be willing to purchase. In order to prepare the marketing data so that the marketing data may be organized and distributed to a business, the marketing data may be grouped based upon a dimension of the marketing data set. For example, the marketing data set may be grouped based on the values of an attribute of the data set. For instance, the marketing data may be grouped using a geographic location attribute, where the marketing data may be grouped into a number of cities, where each grouping contains marketing data specific to a particular city. Further, the marketing data set may also be grouped by fiscal quarter using a date attribute. Thus, the marketing data set may be grouped into a number of data groupings where each grouping may contain marketing data for a specific city for a fiscal quarter of a year.

After grouping the data of a data set, the data may be placed into a data file 212. Based on the example above, a number of data files 212 may be created containing marketing data for various cities, thus, enabling a business to select one or more data files for cities that the business may be interested in purchasing. In one example configuration, after placing data into a data file 212, the data organization module 230 may be used to compress a data file, where a lossless data compression technique may be used to compress the data contained within the data file. Compressing a data file 212 may reduce an amount of storage space within a data store 210 needed to store the data file 212. Further, a compressed data file 212 may contain fewer bits, resulting in a smaller amount of bits that may need to be transferred over a communications network 246 when the data file 212 is transferred between two data stores as compared to transferring an uncompressed data file 212 over the network 246 (i.e., transferring a data file 212 between the distributed data store cluster 202 and the data store 210).

The data files 212 may be stored in a data store 210 that may be accessed over a computing network 246. Metadata 214 may be associated with each data file 212 so that the data file 212 can be identified. In one example configuration, the data store 210 may be accessible to the computing device 216 and the distributed data store cluster 202. The data store 210 may be configured to host a file system that may manage the various data files 212 and associated metadata 214 stored on the data store 210. For example, data files 212 resulting from dividing a data set into a number of data files may be placed into a data store 210 "container" or "bucket", from which a data file 212 may be accessed when the data file 212 is acquired by a customer. In one example, a virtual data storage system may be used to store data files 212. The virtual data storage system may act as a staging area for the data files 212 that may be accessible using a data market module 222.

The data market module 222 may provide an interface to a data marketplace that enables a customer to acquire data from a data set that has been organized into a number of data files 212. As an example, a customer may access the data market module 222 using a client device 234 by way of the Internet 232. The interface of the data marketplace may be, in one example, a command line interface, or, in another example, a graphical user interface that enables a customer to view and/or search for data that the customer may wish to acquire. For example, a customer using a graphical user interface may view available data files 212 and data topics that are associated with one or more data files 212. Thus, a customer may also be able to search for a data file by specifying one or more parameters that may be associated with the data file 212 that the customer may be looking for. When searching for a data file 212, metadata 214 associated with the data file 212 may be used to identify the data file 212 and return a description of the data file 212 with the results of the search. As will be appreciated, a data marketplace may be a proprietary data marketplace that is provided within a system 200 or may be a third-party data marketplace that communicates with the system 200 via an API (application programming interface).

Once a customer has identified and selected one or more data files 212 that the customer wishes to acquire via the data marketplace, a manifest module 224 may be used to create a manifest file for the data files 212 selected by the customer. A manifest file may be created by first identifying the data files 212 selected by the customer and then calling a URL constructor module 228, via an API, that may be used to generate a URL (uniform resource locator) for each data file 212 selected by the customer. The URL may provide a file reference to a location where a data file 212 may be stored within the data store 210. Information may be included in the URL that may be used to authenticate a customer as well as information that may establish a limited time period for accessing the data file 212. In one example configuration, a URL may be obtained from metadata that is associated with a data file and then information used to provide customer access and establish a limited access period to the data file 212 may be added to the URL.

In one example configuration, an electronic signature may be added to a URL that can be used to authenticate a customer. For instance, a hash function may be used to create a hash value by converting a data segment (e.g., a URL character string or a policy statement) to the hash value. The hash value can then be encrypted (e.g., signed) using a customer's private key to create an electronic signature, and the hash value as signed with the electronic signature may be included in the URL. Later, when the URL may be used to retrieve an associated data file 212 from the data store 210, the electronic signature may be decrypted using the customer's public key. The hash value and the decrypted electronic signature hash value may be compared and if the hash value and the decrypted electronic signature hash value are equal, then the electronic signature is valid, thus, authenticating the customer via the electronic signature.

In another example configuration, an expiration date and time may be included in a URL. The expiration date and time may be used to establish a time period in which a data file 212 may be accessed using the manifest file. Thereafter, access to the data file 212 may be restricted. As an example, a time window may be established for access to a data file 212 after a data file 212 may have been acquired by a customer via a data marketplace. The time window for accessing the data file 212 may be reflected in the URL by including an expiration date and time in the URL. As a specific example of a URL that includes and expiration date and time, a customer may purchase a data file 212 on May 11, 2013 at 12:15 PM. A time window for retrieving the data file 212 may be set for one minute. The expiration date and time would then be May 11, 2013 at 12:16 PM. The expiration date and time may be included in the URL and when the URL is used to retrieve the data file 212, the expiration date and time may be compared to a current system date and time to determine whether the expiration date and time are within the time window.

In order to prevent manipulation of the expiration date and time for the purpose of accessing the data file 212 outside of a time window, the expiration date and time may, in one example, be electronically signed. As described above, an electronic signature may be generated where the expiration date and time may be converted to a hash value, and the hash value may be encrypted using a customer's private key to create an electronic signature (i.e., a signed hash value). When the expiration date and time are later used to verify that the expiration date and time are within the time window, the electronic signature may be decrypted using the customer's public key and the decrypted electronic signature hash value may be compared with the hash value of the date and time, and, if equal, then the expiration date and time are valid.

After creating a signed URL for each of the data files 212 purchased by a customer, the signed URLs may be returned from the URL constructor module 228 to the manifest module 224 where the signed URLs may be inserted into the manifest file. In one example configuration, the resulting manifest file may be provided to the client device 234 by way of the Internet 232, whereupon the manifest file may be provided from the client device 234 to a data copy service 226 located on a distributed data store cluster 202. In another example configuration, the manifest file may be provided directly to the data copy service 226 from the computing device 216.

Upon receiving the manifest file, the data copy service 226 may authenticate the URL(s) contained within the manifest file. A URL may be authenticated via an electronic signature that may be included in the URL as described earlier. An expiration date and time may also be verified. After determining that a URL is valid, the data copy service 226 may copy a data file 212 associated with the URL from the data store 210 through a communications network 246 to the distributed data store cluster 202. In one example configuration, a leader node 204 may be instructed to have the nodes 206 of the distributed data store cluster 202 access a data file 212 in the data store 210 using a file location provided in an associated URL. The data file 212 may be copied from the file location in the data store 210 and the data contained in the data file 212 may be ingested into the nodes 206 of the distributed data store cluster 202. In one example, a distributed application (e.g., MapReduce) may be used to ingest the data of a data file 212 into the nodes 206 of the distributed data store cluster 202. While this description describes the licensing and copying of a single data file 212, a plurality of data files may be licensed and copied for use using this same system.

Having copied a data file 212 from the data store 210 and ingested the data of the data file 212 into the distributed data store cluster 202, the data may now be utilized by a the distributed data store cluster 202 and the results created by distributed data store cluster 202 may be accessible to the customer using a client device 234. For example, a MapReduce application may process the data to provide a result.

A client device 234 used by a customer may include any device that may be capable of sending and receiving data over the Internet 232. A client device 234 may comprise, for example a processor-based system such as a computing device. Such a computing device may contain one or more processors 244, one or more memory modules 242 and a graphical user interface 236. A client device 234 may be a device such as, but not limited to, a desktop computer, laptop or notebook computer, tablet computer, mainframe computer system, handheld computer, workstation, network computer, or other devices with like capability. A client device 234 may include a browser 238 that may enable the client device 234 to communicate with a data market module 222 provided by a computing device 216 and with a distributed data store cluster 202. The client device 234 may include a display 240, such as a liquid crystal display (LCD) screen, gas plasma-based flat panel display, LCD projector, cathode ray tube (CRT), or other types of display devices, etc.

The various processes, modules and/or other functionality contained on the computing device 216 may be executed on one or more processors 218 that are in communication with one or more memory modules 220 according to various examples. The computing device 216 may comprise, for example, of a server or any other system providing computing capability. Alternatively, a number of computing devices 216 may be employed that are arranged, for example, in one or more server banks or computer banks or other arrangements. For purposes of convenience, the computing device 216 is referred to in the singular. However, it is understood that a plurality of computing devices 216 may be employed in the various arrangements as described above.

Various data may be stored in a data store 210 that is accessible to the computing device 216 and the distributed data store cluster 202. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the data store 210 and the distributed data store cluster 202 may include storage systems such as a SAN (Storage Area Network), cloud storage network, volatile or non-volatile RAM, optical media, or hard-drive type media. The data store 210 and the distributed data store cluster 202 may be representative of a plurality of data stores 210 as can be appreciated.

The distributed data store cluster 202 may comprise a group of computing devices, physical or virtual, with associated data stores. A distributed data store cluster 202 may be one of a plurality of distributed data store clusters within a distributed database management system. The clusters and nodes of a distributed database management system may be located in a single physical location or may be dispersed over a network of interconnected computing devices. A network 246 can be utilized to interconnect the nodes of the distributed data store cluster 202 with other components of the system 200. The network 246 can be a local area network (LAN) which may be connected to a Wide Area Network (WAN) and the Internet 232 enabling a customer to access the distributed data store cluster 202. Components utilized for such a network 246 may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3A:
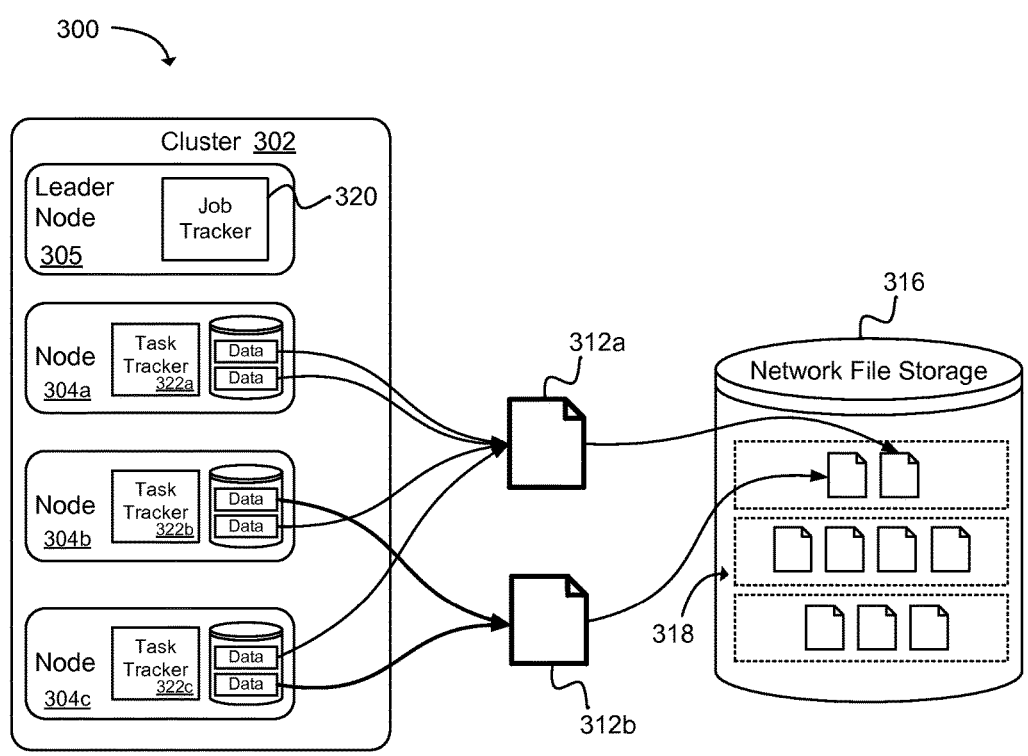
FIG. 3a is a diagram that illustrates an example of a method for dividing a data set into a plurality of data files.

FIG. 3a is a diagram illustrating an example of a method 300 for dividing a distributed data set into a number of data files. The distributed data set may be stored within a distributed computing system comprising a compute service and a distributed storage service. The distributed computing system may include a leader node 305 and a set of nodes 304a-c that have been allocated to form a cluster 302. The cluster 302 may be used to execute distributed applications. Each node 304a-c may be associated with a respective data store in which a portion of the distributed data set may be stored.

The distributed computing system may be a virtual distributed computing system with a virtualization management layer executing on a hardware layer. The hardware layer may include a plurality of physical computers or servers. In this way, the virtualization management layer may execute across the plurality of computers found in the hardware layer. The virtualization management layer may provide a platform in which virtual nodes 304a-c may be created. In other words, virtual nodes 304a-c may execute across the plurality of computers found in the hardware layer by using the platform provided by the virtualization management layer. For example, the virtualization management layer may contain a hypervisor to manage the nodes 304a-c.

A distributed data set may be selected from the cluster 302 and divided into a number of data files 312a-b using a distributed application. A distributed application may coordinate the movement of data between the nodes 304a-c of the cluster 302, executing various tasks in parallel and managing communications between the nodes 304a-c. In executing a distributed application, the cluster 302 may use a job tracker 320 and a task trackers 322a-c running on each of the nodes 304a-c. A distributed application may be submitted to the job tracker 320 for execution across the cluster 302. The job tracker 320 may then push computational work out to the task trackers 322a-c where the jobs for the distributed application can be divided into tasks and tracked as the tasks execute.

As a specific illustration using a MapReduce application to divide and arrange a data set from the cluster 302, GIS (geographic information system) data may be stored in a data set within a cluster 302. The GIS data may be distributed among the different nodes 304a-b. The MapReduce application may submit a job to the job tracker 320 to map the GIS data by filtering and sorting the GIS data into, for example, geographic regions and then reduce the GIS data so that information about each geographic region may be grouped into the separate data files 312a-b. The job tracker 320 may then push the computational work of the MapReduce application to the task trackers 322a-c. The task trackers 322a-c may then perform the work of mapping and reducing the GIS data.

Having selected, mapped and reduced the distributed data set, the organized data of the data set may be placed in individual files 312a-b. For example, GIS data for the city of Seattle may be placed in one data file 312a and GIS data for the city of San Francisco may be placed in another data file 312b.

In one example configuration, after placing data into a data file 312a-b, the data file 312a-b may be compressed. Compressing data files 312a-b may result in faster transfers of data files 312a-b between a cluster 302 and network file storage 316, as well as conserving storage space on the network file storage 316. In one example, a lossless data compression technique may be used that allows original data placed in a data file 312a-b to be fully reconstructed when decompressing the data file 312a-b.

The resulting data files 312a-b may then be stored in a network file storage 316 that may be partitioned into multiple containers 318 in which data files 312a-b may be stored. The network file storage 316 may be a data store that may be accessible over a network where storage may be provided through a network service interface, such as, but not limited to, ODBC (open database connectivity), SOAP (simple object access protocol), REST (representational state transfer), peer-to-peer protocols, virtualized data storage, etc. As such, file sharing may be enabled allowing a number of clients and systems to access a data file 312a-b stored in the network file storage 316. Providing multiple containers 318 within the network file storage 316 in which data files 312a-b may be stored enables staging of data files 312a-b for sharing and/or commercial use. For example, one container 318 may store stock exchange trading data, another container 318 may store GIS data and still another container 318 may store bioinformatics data. When a data file 312a-b may be added to the network file storage 316, certain metadata may be associated with the data file that enables the data file to be identified within the network file storage 316.

Figure 3B:
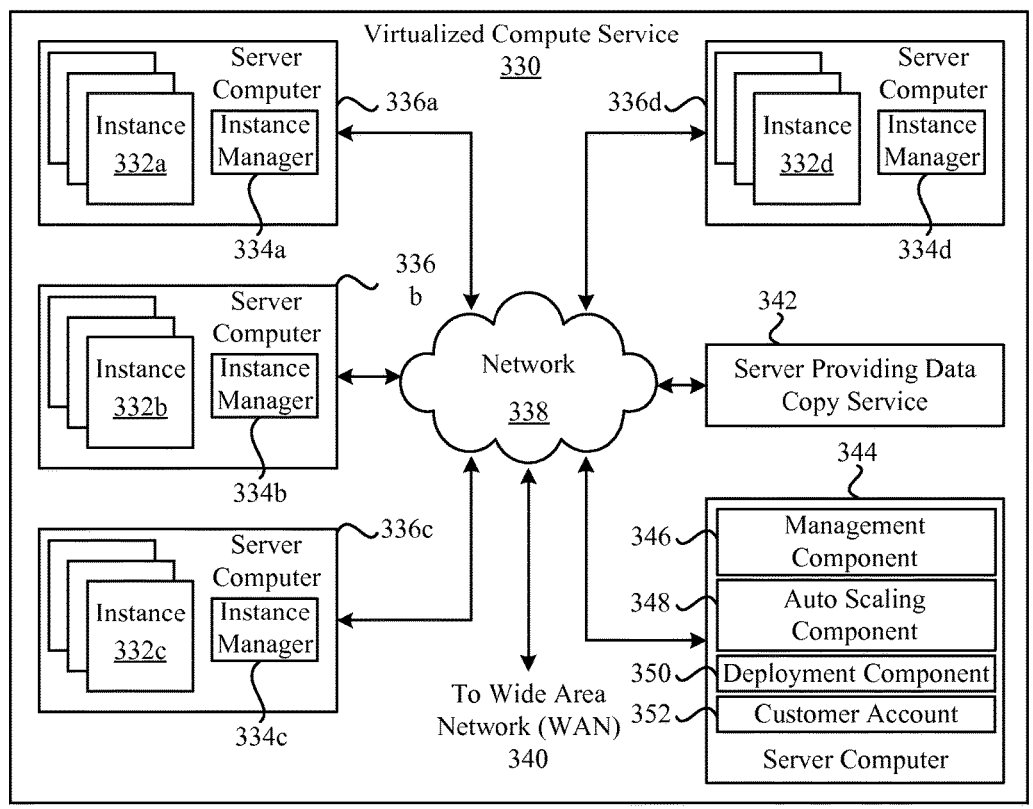
FIG. 3b is a block diagram illustrating an example virtualized compute system to store distributed data sets.

FIG. 3b is a block diagram illustrating an example virtualized compute service 330 that may be used to distribute a data set or apply a separate computing application to the data set. In particular, the virtualized compute service 330 depicted illustrates one environment in which the technology described herein may be used. The virtualized compute service 330 is one type of environment that includes various virtualized service resources that may be used, for instance, to host a computer cluster or virtualized computing instances. For example, the virtualized compute service may implement nodes of a data store cluster or computer cluster using the instances, as described later in the virtualized compute service 330.

The virtualized compute service 330 may be capable of delivery of computing and storage capacity as a service to a community of end recipients. In one example, the virtualized compute service may be established for an organization by or on behalf of the organization. That is, the virtualized compute service 330 may offer a "private cloud environment." In another example, the virtualized compute service 330 may support a multi-tenant environment, wherein a plurality of customers may operate independently (i.e., a public cloud environment). Generally speaking, the virtualized compute service 330 may provide the following models: Infrastructure as a Service ("IaaS"), Platform as a Service ("PaaS"), and/or Software as a Service ("SaaS"). Other models may be provided. For the IaaS model, the virtualized compute service 330 may offer computers as physical or virtual machines and other resources. The virtual machines may be run as guests by a hypervisor, as described further below. The PaaS model delivers a computing platform that may include an operating system, programming language execution environment, database, and web server. Application developers may develop and run their software solutions on the virtualized compute service platform without incurring the cost of buying and managing the underlying hardware and software. The SaaS model allows installation and operation of application software in the virtualized compute service. End users may access the virtualized compute service 330 using networked client devices, such as desktop computers, laptops, tablets, smartphones, etc. running web browsers or other lightweight client applications, for example. Those skilled in the art will recognize that the virtualized compute service 330 may be described as a "cloud" environment.

The particularly illustrated virtualized compute service 330 includes a plurality of server computers 336*a-d*. While four server computers are shown, any number may be used, and large centers may include thousands of server computers. The server computers 336*a-d* may provide computing resources for executing software instances 332*a-d*. Instances 332*a-d* may, for example, be virtual machines. As known in the art, a virtual machine is an instance of a software implementation of a machine (i.e. a computer) that executes applications like a physical machine. In the example of virtual machine, each of the servers 336*a-d* may be configured to execute an instance manager 334*a-d* capable of executing the instances. The instance manager 334*a-d* may be a hypervisor or another type of program configured to enable the execution of multiple instances 332 on a single server. Additionally, each of the instances 332 may be configured to execute one or more applications.

It should be appreciated that although this discussion is primarily in the context of virtual machines, other types of instances may be utilized with the concepts and technologies disclosed herein. For instance, the technologies disclosed herein may be utilized with storage resources, data communications resources, and with other types of computing resources. The technology might also execute all or a portion of an application directly on a computer system without utilizing virtual machine instances.

One or more server computers 344 may be reserved for executing software components for managing the operation of the server computers 336*a-d* and the instances 332*a-d*. For example, a server computer 344 may execute a management component 346. A customer may access the management component 346 to configure various aspects of the operation of the instances 332 purchased by the customer. For example, the customer may purchase, rent or lease instances and make changes to the configuration of the instances. The customer may also specify settings regarding how the purchased instances are to be scaled in response to demand. An auto scaling component 348 may scale the instances 332 based upon rules defined by the customer. The auto scaling component 348 may allow a customer to specify scale-up rules for use in determining when new instances should be instantiated and scale-down rules for use in determining when existing instances should be terminated, for example. The auto scaling component 348 may consist of a number of subcomponents executing on different server computers 336 or other computing devices. The auto scaling component 348 may monitor available computing resources over an internal management network and modify resources available based on need.

A deployment component 350 may be used to assist customers in the deployment of new instances 332 of computing resources. The deployment component may have access to account information associated with the instances, such as who is the owner of the account, credit card information, country of the owner, etc. The deployment component 414 may receive a configuration from a customer that includes data describing how new instances 332*a-c* may be configured. For example, the configuration may specify one or more applications to be installed in new instances 332*a-c*, provide scripts and/or other types of code to be executed for configuring new instances 332*a-c*, provide cache logic specifying how an application cache should be prepared, and other types of information. The deployment component 350 may utilize the customer-provided configuration and cache logic to configure, prime, and launch new instances 332. The configuration, cache logic, and other information may be specified by a customer using the management component 346 or by providing this information directly to the deployment component 350.

Customer account information 352 may include any desired information associated with a customer of the multi-tenant environment. For example, the customer account information may include a unique identifier for a customer, a customer address, billing information, licensing information, customization parameters for launching instances, scheduling information, auto-scaling parameters, etc. As described above, the customer account information may also include security information used in encryption of asynchronous responses to API requests. By "asynchronous" it is meant that the API response may be made at any time after the initial request and with a different network connection.

A network 338 may be utilized to interconnect the server computers 336*a-d* and the server computers 344, 342. The network 338 may be a local area network (LAN) and may be connected to a Wide Area Network (WAN) 340 or the internet so that end users may access the virtualized compute service 330. It should be appreciated that the network topology illustrated in FIG. 3*b* has been simplified and that many more networks and networking devices may be utilized to interconnect the various computing systems disclosed herein.

Figure 4:
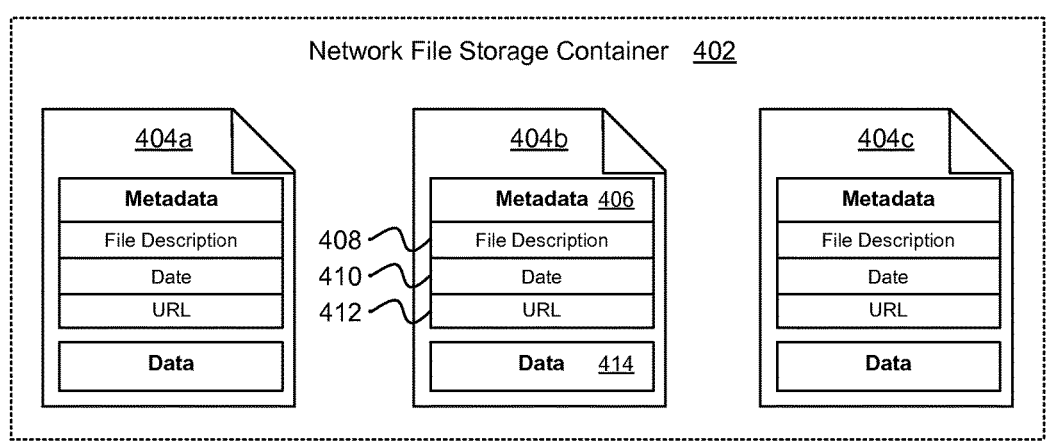
FIG. 4 is a diagram illustrating example data files and associated metadata.

FIG. 4 is a diagram illustrating a network file storage container 402 that may be included within a network file storage system, wherein a number of data files 404*a-c* may be stored. Each data file 404*a-c* may be associated with certain metadata 406 that may be used to identify data 414 contained within a data file 404*a-c*. In one example configuration, the metadata 406 associated with a data file 404*a-c* may include a file description 408, a date 410 and a URL (uniform resource locator) 412.

The file description 408 may provide a description of the data contained in the data file 404*a-c*. As an example, where stock exchange trading data may be contained in a data file 404*a-c*, the file description 408 for the data file may specify what stock the trading data is for. For instance, a stock symbol (e.g., GM, XRX, AIG, etc.) or a CUSIP (Committee on Uniform Security Identification Procedures) number may describe the data file as stock trading data. In another example, where GIS (geographic information system) data may be contained in a data file 404*a-c*, the file description 408 assigned to the data file may be a geographic region for which the GIS data represents. It should be noted that the file description 408 assigned to a data file 404*a-b* may be any description that adequately describes the data contained therein, and that the examples provided above are merely representative and therefore not limiting.

The date 410 included in the metadata 406 associated with a data file 404a-c may indicate a date that is associated with the data 414 contained in the data file. As an example, data files 404a-c containing stock exchange trading data for a particular stock may be assigned dates 410 that indicate which trading day the data contained in the data file represents. As a specific example, a number of data files 404a-c may contain trading data for DIS (The Walt Disney Company). Each of the data files 404a-c may be assigned a date (e.g., Month, Day and Year) that represents the day of the year that the DIS stock traded. Thus, a first data file 404a may have a file description 408 of "DIS" and a date 410 of "09-27-2013". A second data file 404b may have a file description 408 of "DIS" and a date 410 of "09-28-2013" and a third data file 404c may also have a file description 408 of "DIS", but may have a date 410 of "09-29-2013".

The URL 412 metadata 406 may provide a file location within a network file store where a data file 404a-c may be located. By associating URL metadata with a data file 404a-c, the data file may be retrieved or copied from the network file store. In one example, after a data file 404a-c may have been purchased by a customer using a data marketplace, the URL 412 may be used by a process that generates an electronically signed URL. The process may retrieve the URL metadata and add an electronic signature to the URL 412, which may then be used (e.g., by a data copy service or a client process) to locate and retrieve the data file associated with the URL and copy the data from the data file to a data store that may be accessible to a customer.

When a search of a network file store may be conducted, metadata 406 associated with the data files 404a-c stored within the network file store may be searched. A search of the metadata 406 may identify the data files 404a-c stored within the network file store (e.g., a file description 408 and a date 410) and provide a location that includes a network file storage container 402 where the data file may be found via a URL 412.

Figure 5:
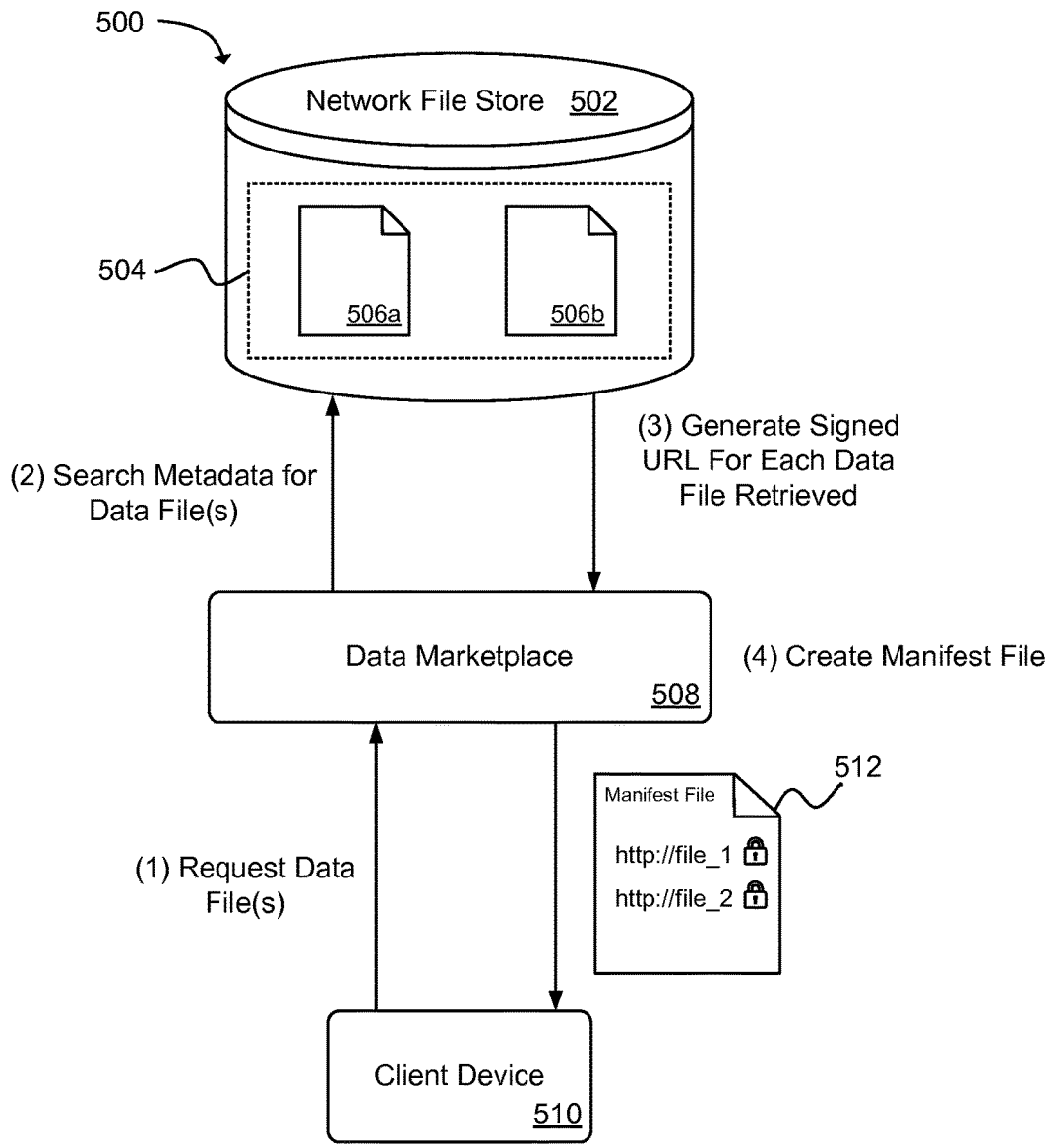
FIG. 5 is a diagram that illustrates an example method for requesting a data file using a data marketplace.

FIG. 5 is a diagram illustrating one example method 500 for requesting a number of data files 506a-b via a data marketplace 508 and a network file store 502. A customer, using a client device 510, may access a data marketplace 508 that enables a customer to view, search and obtain a subset of a data set divided into a number of data files 506a-b. In one example, customers may obtain the data using the data marketplace 508 by purchasing individual data files 506a-b. In another example, the data files 506a-b may be shared with a customer via the data marketplace 508.

Upon accessing the data marketplace 508, a customer may be presented with data files 506a-b that may be available to the customer to obtain. In addition, a customer may search for available data files 506a-b using a data marketplace search interface. Metadata associated with the data files 506a-b may be used to identify data files 506a-b stored on a network file store 502. For example, the metadata may be searched to identify a data file 506a-b that a customer may be searching for. The metadata may provide a description of a data file 506a-b, as well as a date associated with data contained in the data file 506a-b and a URL that specifies a location in the network file store 502 where the data file 506a-b may be stored.

Using a data marketplace interface, a customer may specify which data files 506a-b the customer would like to obtain. After the customer selects one or more data files 506a-b, the metadata associated with a selected data file 506a-b may be referenced to determine where in the network file store 502 the data file 506a-b may be located. For example, a URL included in the metadata may be identified where the URL may provide a file path to a container 504 in the network file store 502 where the data file 506a-b is located.

An electronically signed URL may be generated for each data file 506a-b selected by a customer. An electronically signed URL may be based on a URL identified from metadata associated with a data file 506a-b. Thus, using the URL identified from the metadata and additional information, such as an electronic signature and an expiration data and time, may be added to the URL as described earlier.

After generating an electronically signed URL for each data file 506a-b, a manifest file 512 may be created and the electronically signed URLs may be placed in the manifest file 512. In one example configuration, the manifest file 512 may then be provided to a customer via a client device 510, whereupon the manifest file 512 may be used by the customer to obtain the data that the customer selected using a data copy module as discussed below with reference to FIG. 6 or another data capture module.

Figure 6:
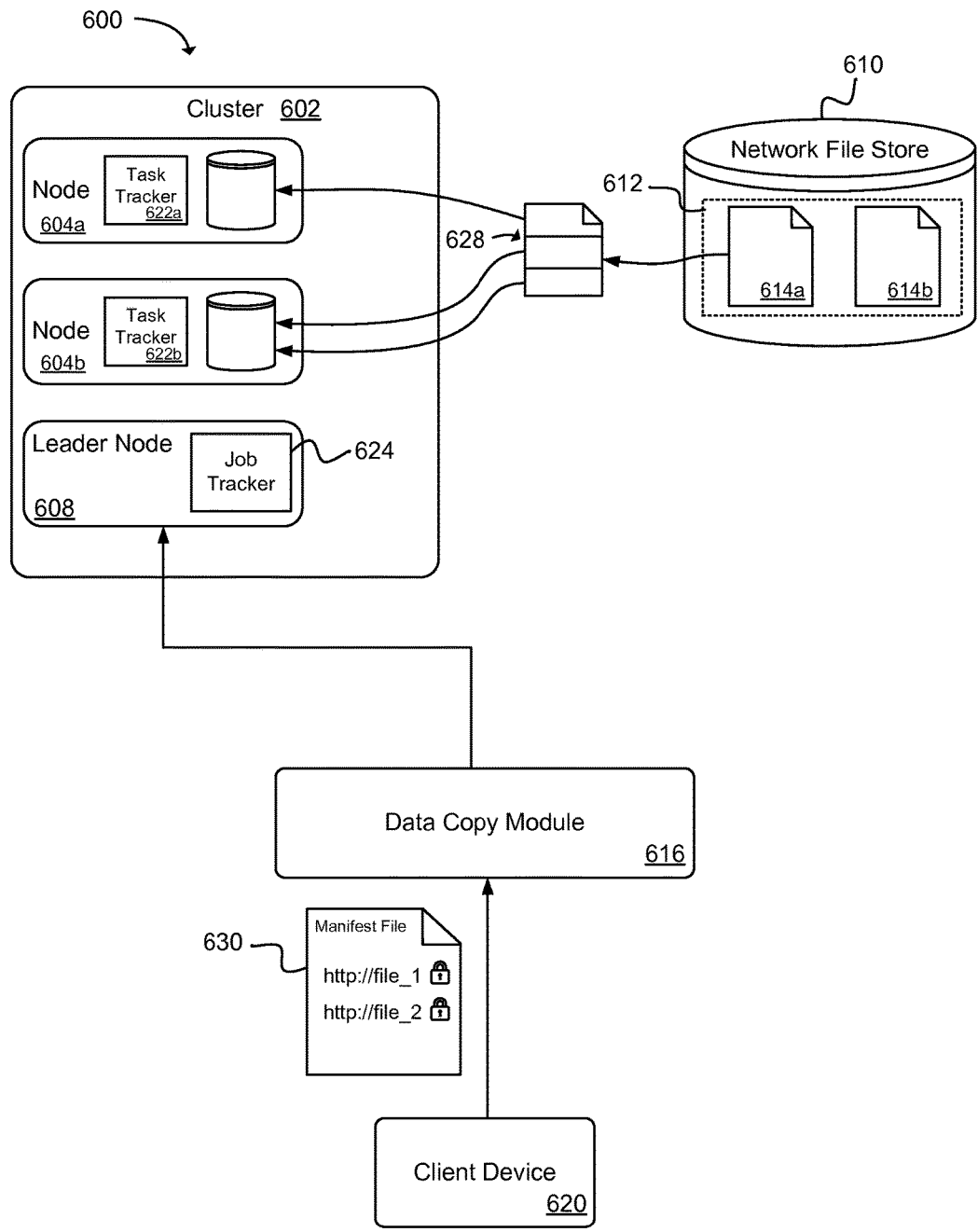
FIG. 6 is a diagram illustrating an example method for distributing data from a network file store to a distributed data store cluster.

FIG. 6 is a diagram illustrating an example method 600 for copying a data file 614a-b from a network file store 610 to a distributed data store cluster 602 where data contained in the data file 614a-b may then be accessed by a customer using a client device 620. A manifest file 630 containing one or more electronically signed URLs that reference the data files 614a-b may be submitted to a data copy module 616. In one example configuration, the data copy module 616 may validate each electronically signed URL included in the manifest file 630. An electronic signature included in an electronically signed URL may be validated, as described earlier, to ensure that the manifest file with the associated electronically signed URL was created by a trusted system for a customer that, for example, purchased the right to access and/or copy the data contained in a data file 614a-b.

An electronically signed URL may provide a customer with a one-time access to a data file 614a-b. In other words, the electronically signed URL may allow a customer to access and copy a data file 614a-b a single time. Thereafter, the customer may store the data from the data file 614a-b in a customer's data store and use the data as the customer wishes, but the customer may not access the originating data file 614a-b again. In one example, one-time access may be accomplished by including an expiration date and time in an electronically signed URL. The expiration date and time may provide a small window of time that allows a customer to access a data file 614a-b and copy the data of the data file 614a-b to a customer's data store. As an illustration, a manifest file 630 may be received from a data marketplace after purchasing a number of data files 614a-b. Whereupon the manifest file 630 may be immediately submitted to a data copy module 616, which verifies the electronically signed URLs contained in the manifest file 630, verifies that the expiration date and time have not expired and copies the data from the data files 614a-b to a customer's data store.

In one example configuration, a data file 614a-b may be copied from a network file store 610 to a distributed data store cluster 602. The cluster 602 may be part of a distributed computing system as discussed in reference to FIG. 3. The cluster 602 may include a number of computing nodes 604a-b controlled by a leader node 608. After validating an electronically signed URL using the data copy module 616, a location within a container 612 in the network file store 610 may be identified for the data files 614a-b associated with the electronically signed URL. The nodes 604a-b of the cluster 602 may then be instructed to transfer the data of the data files 614a-b to the nodes 604a-b.

In one example, data from the data file 614*a-b* may be transferred from the network file store 610 to the nodes 604*a-b* of the cluster 602 using a MapReduce application. As discussed in reference to FIG. 3, the cluster 602 may use a job tracker 624 and task trackers 622*a-b*. The MapReduce application may be submitted to the job tracker 624 for execution across the cluster 602. The job tracker 624 may then push computational work out to the task trackers 622*a-b* where the jobs for the MapReduce application can be divided into tasks and tracked as the tasks execute. The data from the data file 614*a-b* may be divided into a number of smaller data sets 628 and the data sets 628 may be divided among the nodes 604*a-b* and stored where the data from the data file 614*a-b* may now be accessible to the customer to use.

In an example configuration where a data file 614*a-b* may be a compressed data file, namely, the data file 614*a-b* may have been compressed using a data compression technique and then stored in a container 612 of the network file store 610. The data file 614*a-b* may be decompressed prior to copying the data from the data file 614*a-b* to the customer's data store.

Figure 7:
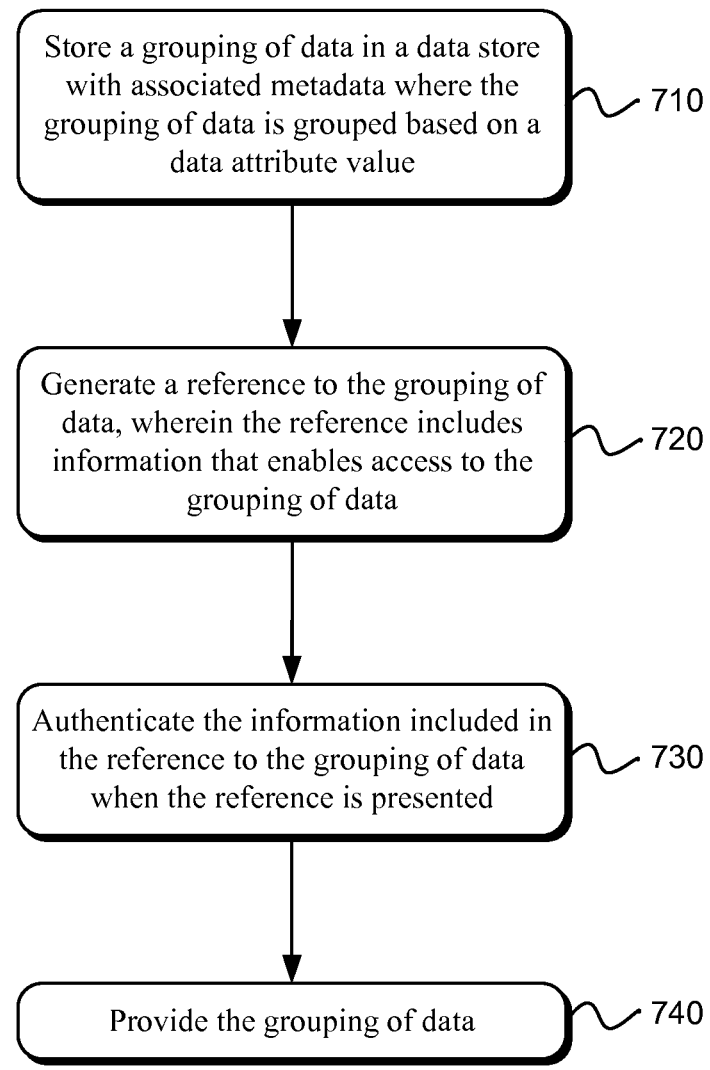
FIG. 7 is a flow diagram illustrating an example method for distributing a data set.

FIG. 7 is a flow diagram illustrating an example method for distributing a data set. Beginning in block 710, a grouping of data may be stored in a data store with associated metadata where the grouping of data may be grouped based on a data attribute or a value in a data attribute. Examples of a grouping of data may include a data file, a flat file, a spreadsheet, a stored procedure (SQL statement) that retrieves a grouping of data from a data store, a grouping of data accessible by a key-value pair in a No-SQL data store, etc. In an example where a data set may be divided into a number of smaller groupings of data, which may in turn be offered to a customer, the data of the large data set may be grouped and then divided based on a data attribute value. For example, where a data set may be divided into smaller groupings of data for the purpose of offering the groupings of data for sale to a customer via a data marketplace, the groupings of data may be organized into logical data sets that a customer would want to purchase. Thus, as an example, if a data set is bioinformatics data, the data set may be divided into a number of smaller data groupings based on an attribute value. Where an attribute of the data set is a genome, the data set may be divided into groupings of data based upon the values of the attribute, such as dog genome, cat genome, fish genome, bird genome, etc. A customer wishing to purchase bioinformatics data for dogs may purchase the dog bioinformatics data grouping.

As discussed previously, metadata may be associated with each grouping of data stored in a data store, where the metadata may be used to identify a grouping of data and the metadata may provide a reference to the data files (i.e., a URL). Thus, in the case where the grouping of data may be bioinformatics, metadata associated with a grouping of data may identify the data grouping as dog genome data, may identify a date when the dog genome was sequenced and may provide a URL to the grouping of data within a data store.

As in block 720, a reference to the grouping of data may be generated, wherein the reference may include information that provides access to the grouping of data. In one example configuration, the reference may be a URL containing an electronic signature that may be used to verify the origin of the reference, as detailed previously. In another example configuration, the reference may include information that blocks the reference from being used more than one time. For example, the reference may include a timestamp that, when presented to a process, may be used to calculate whether the timestamp fits within a time window. In the case where the timestamp falls outside of the time window, the reference may not be used to access an associated grouping of data.

As another example, a one-time use transaction ID may be included in the reference. In the case that the transaction ID is used more than one time in a reference, the subsequent references may not be used to access associated groupings of data. As an illustration, when a customer receives a manifest file containing a reference to a grouping of data from a data marketplace, a transaction ID may be generated and included in the reference. When the reference is presented for access to the grouping of data, the transaction ID may be recorded. In the case where a reference with the same transaction ID is presented for access to the grouping of data, a process may determine whether the transaction ID has been presented previously, and then deny access to the grouping of data.

It should be noted that various methods may be used to ensure that a reference is used once to access a grouping of data and that any method that stops a reference from being used more than one time to access a grouping of data is within the scope of this disclosure.

As in block 730, the information included in the reference to the grouping of data may be authenticated when the reference is presented. In an example where an electronic signature may be included in the reference, the electronic signature may be authenticated to ensure that the reference was generated by a trusted source, such as a data marketplace. Moreover, in a case where a reference may be a one-time use reference, information included in the reference that prevents the reference from being used more than one time may, in some cases, be authenticated. For example, to prevent manipulation of one-time use information contained in the reference, the one-time use information may be electronically signed by a process that creates the one-time use information. In a case where the one-time use information is modified, the electronic signature will no longer be valid and use of the associated reference to access a referenced grouping of data will be barred.

Once the information included in the reference may be authenticated, as in block 740, the grouping of data may be provided. In one example configuration, the grouping of data may be copied from a data store used to stage the grouping of data to a data store that is accessible to a customer. For example, the grouping of data may be copied to a distributed data store system, non-relational data store (e.g., a NoSQL database), relational data store, data warehouse and/or flat file. The transfer of the grouping of data from the staging data store to the customer's data store may be accomplished over a network. In one example configuration, the data transfer may take place within a network of computing devices where the computing devices are connected via the Internet (e.g., cloud computing).

Figure 8:
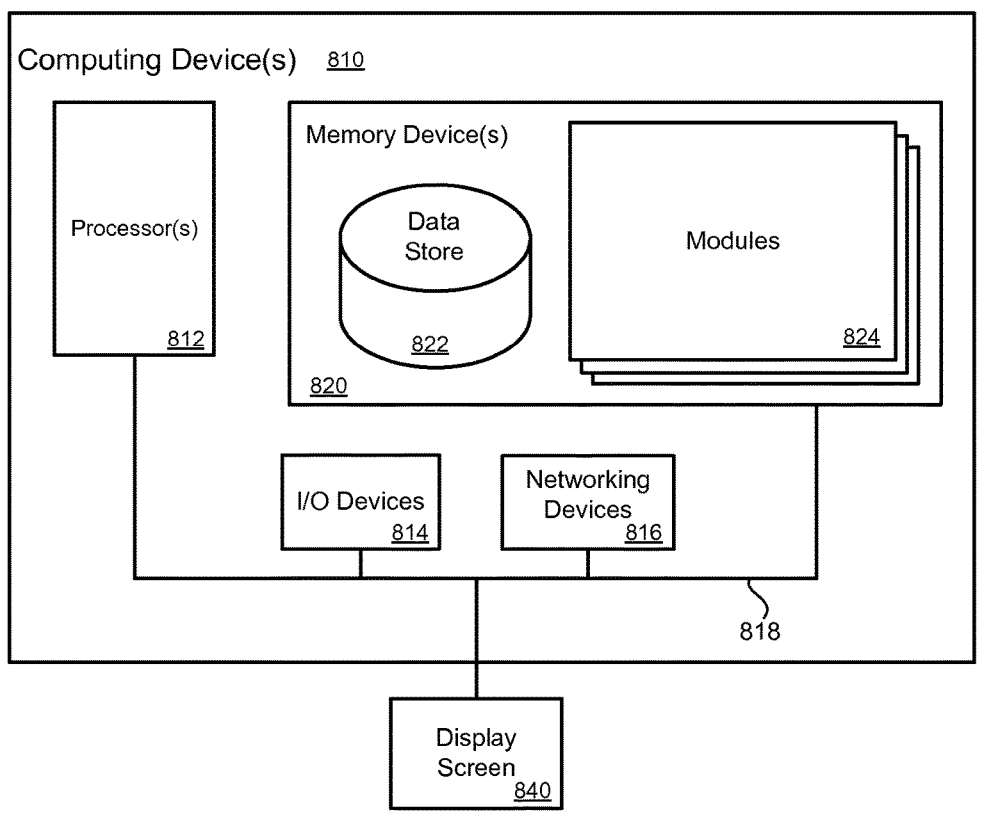
FIG. 8 is block diagram illustrating an example of a computing device that may be used to execute a method for distributing a data set within a networked environment.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device 810 may include a local communication interface 818 for the components in the computing device. For example, the local communication interface 818 may be a local data bus and/or any related address or control busses as may be desired.

The computing device 810, for instance, may be used for data distribution. For example, the computing device 810 may be used to distribute data between computing systems. The memory device 820 may contain a set of modules 824 that are executable by the processor(s) 812 and data for the modules. Located in the memory device 820 may be the set of modules 824 executable by the processor 812. The set of modules 824 may execute the functions described earlier. For example, the set of modules 824 may include a data organization module to divide a data set into a plurality of data files, a data market module to provide a data marketplace interface, a URL constructor module to construct a URL that references a data file, a manifest module to create a manifest file containing a plurality of URLs and a data retrieval module that authenticates URLs contained in a manifest file and retrieves data associated with the plurality of URLs. A data store 822 may also be located in the memory device 820 for storing data related to the modules and other applications along with an operating system that is executable by the processor(s) 812. Other applications may be stored in the memory device 820 and may be executable by the processor(s) 812. Components or modules discussed in this description may be implemented in the form of software using high programming level languages that are compiled, interpreted or executed using a hybrid of the methods.

The computing device may also have access to I/O (input/output) devices 814 that are usable by the computing devices. An example of an I/O device is a display screen 840 that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor(s) 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory device 820 may represent multiple memory units that operate in parallel to the processing circuits. This may provide parallel processing channels for the processes and data in the system. The local communication interface 818 may be used as a network to facilitate communication between any of the multiple processors and multiple memories. The local communication interface 818 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for distributing a distributed data set, comprising:
    under control of one or more computer systems configured with executable instructions, retrieving the distributed data set from a distributed data store using a distributed application;
    dividing the distributed data set into a plurality of data subsets using a first attribute of the distributed data set that describes data included in the distributed data set;
    grouping data within the data subsets into a plurality of data files using a second attribute of the data that describes the data;
    storing the plurality of data files in a data store managed by a virtual data storage system, the plurality of data files including metadata that enables the plurality of data files to be identified;
    receiving a request to license a data file included in the plurality of data files;
    generating an encrypted electronic signature;
    generating a URL (Uniform Resource Locator) that references the data file, the URL including the encrypted electronic signature and access information for the data file;
    generating a manifest file containing the URL that references the data file;
    providing the manifest file in response to the request to license the data file; and
    authenticating the encrypted electronic signature included in the URL when the URL is presented.

2. The method as in claim 1, further comprising storing a copy of the data file to a customer data store managed by the virtual data storage system in response to authenticating the URL.

3. The method as in claim 1, wherein the first attribute and the second attribute of the data describe content of the data.

4. The method as in claim 1, further comprising providing a customer with a data marketplace interface for acquiring the license to the data file.

5. The method as in claim 1, wherein the encrypted electronic signature further identifies a customer, an expiration date, and time indicating when the data file is no longer accessible to the customer.

6. The method as in claim 1, wherein the manifest file acts as a license to the data file allowing the data file to be accessed by a customer who acquired the license to the data file.

7. A computer implemented method, comprising:
    under control of one or more computer systems configured with executable instructions,
        retrieving a distributed data set from a distributed data store;
        organizing the distributed data set into groupings of data using at least one data attribute value that describes data in the groupings of data;
        storing a grouping of data in a data store with associated metadata that describes the grouping of data, wherein the data store is managed by a virtual data storage system;
        receiving a request to acquire the grouping of data;
        generating a reference to the grouping of data, wherein the reference to the grouping of data includes authentication information that enables access to the grouping of data;
        provide the reference to the grouping of data in response to the request to acquire the grouping of data;
        authenticating the authentication information included in the reference to the grouping of data when the reference is presented; and
        providing the grouping of data for the reference that has been authenticated.

8. The method as in claim 7, further comprising receiving a request for the grouping of data and providing a manifest file containing the reference to the grouping of data.

9. The method as in claim 7, wherein generating a reference to the grouping of data further comprises providing a reference to the grouping of data that allows a user one-time access to the grouping of data.

10. The method as in claim 9, further comprising including in the reference to the grouping of data at least one of: a date and a time or an electronic signature in the authentication information, wherein the date and the time specifies how long the reference is valid and the electronic signature identifies a verified user.

11. The method as in claim 7, further comprising placing the grouping of data into a data file and compressing the data file using a lossless data compression technique.

12. The method as in claim 11, further comprising storing the data file in a non-relational data store that allows sharing of the data file to a plurality of users by way of a communications network.

13. The method as in claim 11, wherein the metadata provides a description of the data file, a date associated with data contained in the data file and a reference that provides a location of the data file.

14. The method as in claim 13, further comprising searching the metadata of a plurality of files for metadata related to a data file when a request for the data file is received.

15. The method as in claim 11, wherein providing the data file further comprises decompressing the data file and copying the data file to a data store that is accessible to a user requesting the data file.

16. A system for distributing data sets, comprising:
a processor; and
a memory device including instructions that, when executed by the processor, cause the system to:
provide an interface to a data marketplace enabling a user to purchase data that has been organized into a plurality of data files using a distributed application that retrieves the plurality of data files from a distributed data store, wherein a distributed data set is organized into the plurality of data files using at least one data attribute value that describes the data in the plurality of data files;
receive a request to purchase a data file included in the plurality of data files;
generate a URL (Uniform Resource Locator) that references the data file that has been acquired by the user, wherein the URL includes authentication information that provides access to the data file;
create a manifest file containing at least the URL that references the data file that has been acquired by the user;
provide the manifest file in response to the request to purchase the data file; and
receive a request for the data file that includes the manifest file containing the at least one URL;
authenticate the authentication information included in the URL when the URL is presented; and
retrieve the data file associated with the at least one URL from a data store managed by a virtual data storage system.

17. The system as in claim 16, wherein the memory device includes instructions that, when executed by the processor, causes the system to identify a data set in a distributed data store and groups data in the data set into data files based at least in part on an attribute value associated with the data set and stages the data files in the data store that is accessible over a computing network.

18. The system as in claim 17, wherein the memory device includes instructions that, when executed by the processor, causes the system to compress the data file using a data compression technique and assigning metadata that is used to identify the data file within the data store.

19. The system as in claim 16, wherein the memory device includes instructions that, when executed by the processor, causes the system to identify the data file acquired by the user by searching metadata related to the plurality of data files stored in the data store.

20. The system as in claim 16, wherein the memory device includes instructions that, when executed by the processor, causes the system to instruct at least one node of a distributed data store cluster to retrieve the data file from the data store using the URL.

* * * * *